Dec. 11, 1928.
P. GOODMAN
GAS MAIN STOPPER
Filed Oct. 5, 1927
1,695,187
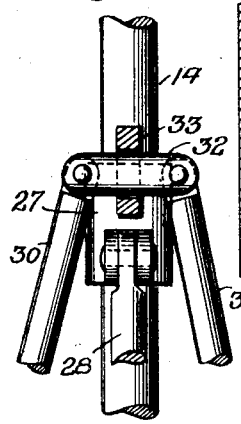
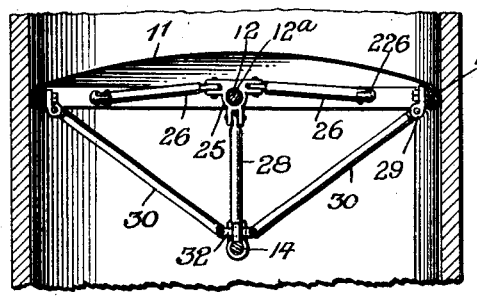
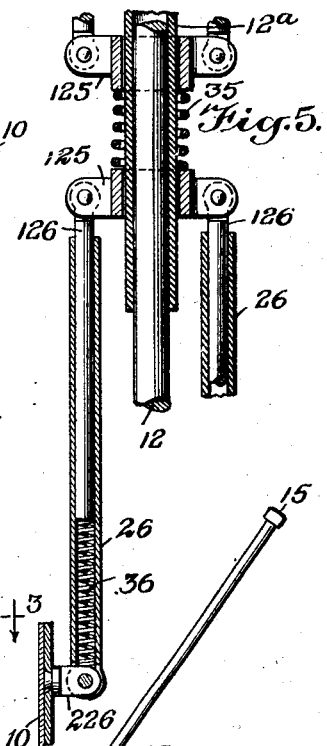
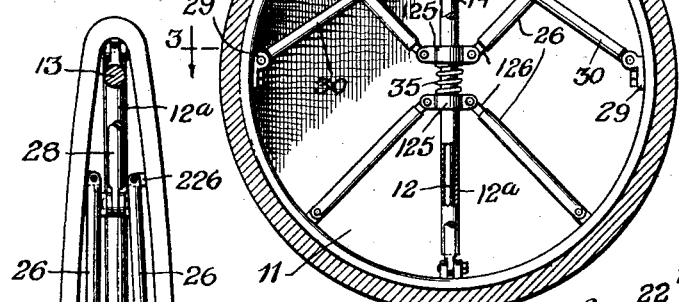
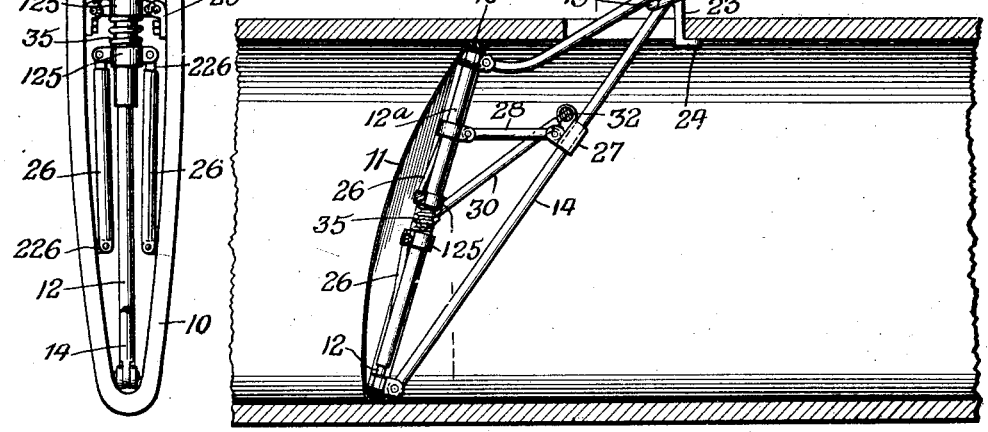
WITNESSES
INVENTOR
PATRICK GOODMAN
BY
ATTORNEY Patented Dec. 11, 1928.

1,695,187

UNITED STATES PATENT OFFICE.

PATRICK GOODMAN, OF BROOKLYN, NEW YORK.

GAS-MAIN STOPPER.

Application filed October 5, 1927. Serial No. 224,235.

My invention relates to a gas main stopper and is intended to constitute an improvement on the device forming the subject matter of United States Patent No. 1,627,502, granted to me May 3, 1927, as well as an improvement on gas main stoppers forming the subject matter of Patent No. 1,539,730, granted to me May 26, 1925. In the said patents the assemblage comprises a frame collapsible and expansible, and having a diaphragm which is adapted to be passed through a lateral opening in the gas main and then expanded in the main to cut out the flow of gas, said frame having handle bars to extend through the opening and having means to force the handle bars in opposite directions to lock the gas stopper in place.

In the first mentioned patent, bracing means is provided between one of the handle bars and certain telescoping members bridging the diaphragm, that is to say, extending diametrically across the frame. The general object of the present invention is to provide bracing means directly connected with the sides of the frame and with the handle bar referred to, the said last-mentioned bracing members being coordinated with bracing members previously incorporated in the gas main stopper.

Reference is to be had to the accompanying drawing forming a part of this specification, it being understood that the drawing is merely illustrative of one example of the invention.

Figure 1 is a side view of a gas main stopper embodying my present invention, the stopper being shown locked in position in a main shown in longitudinally central vertical section;

Figure 2 is a vertical section substantially on the line 2—2 of Figure 1;

Figure 3 is a horizontal section on the line 3—3 of Figure 2;

Figure 4 is an elevation of a gas main stopper in collapsed form;

Figure 5 is a detail in section of the telescoping brace arms for the expansible frame; and Figure 6 is a detail view given to show the mode of pivoting one end of certain brace elements.

In common with the previous stoppers referred to, the present assemblage includes a collapsible spring frame 10 covered by a yielding packing and having a flexible diaphragm 11 which is stretched across the frame in circular form by exerting pressure on the frame at diametrically opposite points. At these points the frame is provided with pivotally connected telescoping members 12 and 12$^a$, bridging the diaphragm, and pivotally connected handle bars 13 and 14, each bar being provided with suitable hand grips 15 and 115. A hook designated generally by the numeral 16 is provided, having a threaded shank extending through the hand grip 115 and provided with a nut 17 and a second nut 18 at opposite sides of the hand grip 115 to prevent complete detachment of the hook 16 from said hand grip 115.

The hooked end 19 of the hook 16 is adapted to engage beneath a vertically slotted lug 20 on a sleeve 21 fitted on the handle bar 14, said sleeve having a set screw 22. Depending from the sleeve 21 is a bracket 23 having a foot 24 at the lower end adapted to engage the gas main at the opening formed therein for the insertion of the stopper.

With the described arrangement, when the sleeve 21 is positioned on the handle bar 14 with the foot 24 engaging the gas main at the edge of the opening, the hook 19 is engaged beneath the lug 20. It is to be observed that said lug 20 is at the front of the sleeve 21 and the sleeve is so disposed as to position the said lug at the front of the handle bar 14. The said disposition of the lug allows complete clearance for the movement of the handle bar 13 relatively to the handle bar 14 for exerting a force against the frame 10 at the top to jam the frame gas tight in the main. In addition, the provision of the lug 20 at the front of the sleeve 21 and handle bar 14 more effectively applies the force developed by turning the nut 17 forwardly on the hook 16, and it furthermore promotes convenience in the manipulation of the several elements.

I provide on the outer telescoping member 12$^a$ collars 125 and provide telescoping brace arms 26 pivotally connected to said collars 125 and to opposite sides of collapsible frame 10. The telescoping brace arms 26 are four in number arranged in pairs, the inner member of each telescoping arm 26 being pivoted to a collar 25, and the outer telescoping member being pivoted to a stud 226 on frame 10. Between the collars 125 is compression spring 35. Also within each outer or tubular telescoping member of brace arm 26 is a coil spring 30 tending to separate said brace arms 26 and keep them at the same tension and rigid.

A brace 28 is pivoted at one end to sleeve 25 and at its opposite end is pivoted to a sleeve 27 freely slidable on handle bar 14. This sleeve 27 may slide on bar 14 in the collapsing and distension of frame 10 and at all times the brace 28 will be in bracing relation to said bar 14 and said frame.

I provide brace elements 30 pivoted in practice advantageously to the same fittings 29 to which the elements 26 are secured at their outer ends. Said brace elements 30 at their outer ends are pivotally secured as at 32 to the sleeve 27 on the rod 14 to which brace 28 is also pivoted. Thus the pivoting of the elements 30 at their outer ends by fitting 29 on the opposite sides of the horizontal medial plane of the stopper effectively resists strains tending to collapse the frame 10. It will be observed that while the braces 26 are in the plane of the frame 10, and while the brace 28 connects the telescoping members 12ª with the bar 14, the brace elements 30 exert a bracing action between approximately opposite points on the frame 10 and the sleeve 27 on rod 14.

In order to provide against binding of the sleeve 27, or undue straining of the rods 30, I pivotally connect said rods 30 to a transverse pin 32 extending through sleeve 27 so that in the expansion of the frame and the sliding of the sleeve 27 the rods 30 and pin 32 can accommodate themselves to said movement without undue strains.

I would state furthermore that while the illustrated example constitutes a practical embodiment of my invention, I do not limit myself strictly to the exact details herein illustrated, since manifestly the same can be considerably varied without departure from the spirit of the invention as defined in the appended claims.

I claim:

1. A gas main stopper including an expansible frame having means thereon to effect a stoppage of the gas main, handle bars on said frame at an angle to the plane of the frame, expansion means for said frame operable by a longitudinal movement of one handle bar, and a brace connection between the other handle bar and said frame at approximately diametrically opposite points on the frame.

2. A gas main stopper including an expansible frame having means to effect the stoppage of the main, handle bars disposed at an angle to the frame to cause expansion of the frame by longitudinal movement of one handle bar, a sleeve on the other handle bar, a rod formed in telescoping sections disposed in the plane of the frame and connected therewith at diametrically opposite points, a brace rod between said telescoping rod and said sleeve, and brace arms each connected at one end with said sleeve and connected at the opposite end with the said frame.

3. A gas main stopper including an expansible frame having means to effect the stoppage of the main, handle bars on the frame to cause expansion of the frame by longitudinal movement of one handle bar, a sleeve on the other handle bar, a rod formed in telescoping sections disposed in the plane of the frame and connected therewith at diametrically opposite points, a brace rod between said telescoping rod and said sleeve, a pair of collars on said telescoping rod, two brace rods each connected at one end with said collars and connected at the opposite end with the said frame, and brace rods formed of telescoping sections and extending between said sleeve on the handle bar and opposite sides of said frame.

4. In a gas main stopper, an expansible frame having means to effect the stoppage of the main, handle bars on the frame, expansion means for said frame operable by a longitudinal movement of one handle bar, a sleeve on the other handle bar, a transverse pin turnably mounted in said sleeve, brace arms each connected at one end to said transverse pin, and pivotally connected at their other end with the expansible frame.

5. In a gas main stopper an expansible frame, handle bars connected with said frame, expansion means for said frame operable by a longitudinal movement of one handle bar, a rod formed in telescoping sections disposed in the plane of the frame, collars on one section of said telescoping rod, and telescoping brace arms pivotally connected at one end to said collars and pivotally connected at their opposite end to the frame, together with a coil spring interposed between said collars.

6. In a gas main stopper an expansible frame, handle bars connected with said frame and disposed at angles thereto, expansion means for said frame operable by a longitudinal movement of one handle bar, a rod formed in telescoping sections disposed in the plane of the frame, collars on one section of said telescoping rod, and telescoping brace arms pivotally connected at one end to said collars and pivotally connected at their opposite end to the frame, together with a coil spring interposed between said collars, and a coil spring within each outer telescoping member of said telescoping brace arms.

Signed at New York, in the county of New York and State of New York, this 3rd day of October, A. D. 1927.

PATRICK GOODMAN.